May 6, 1969
E. T. NORTON
3,443,119
SHUNT REACTOR FOR TRANSMISSION LINE
Filed Feb. 28, 1967
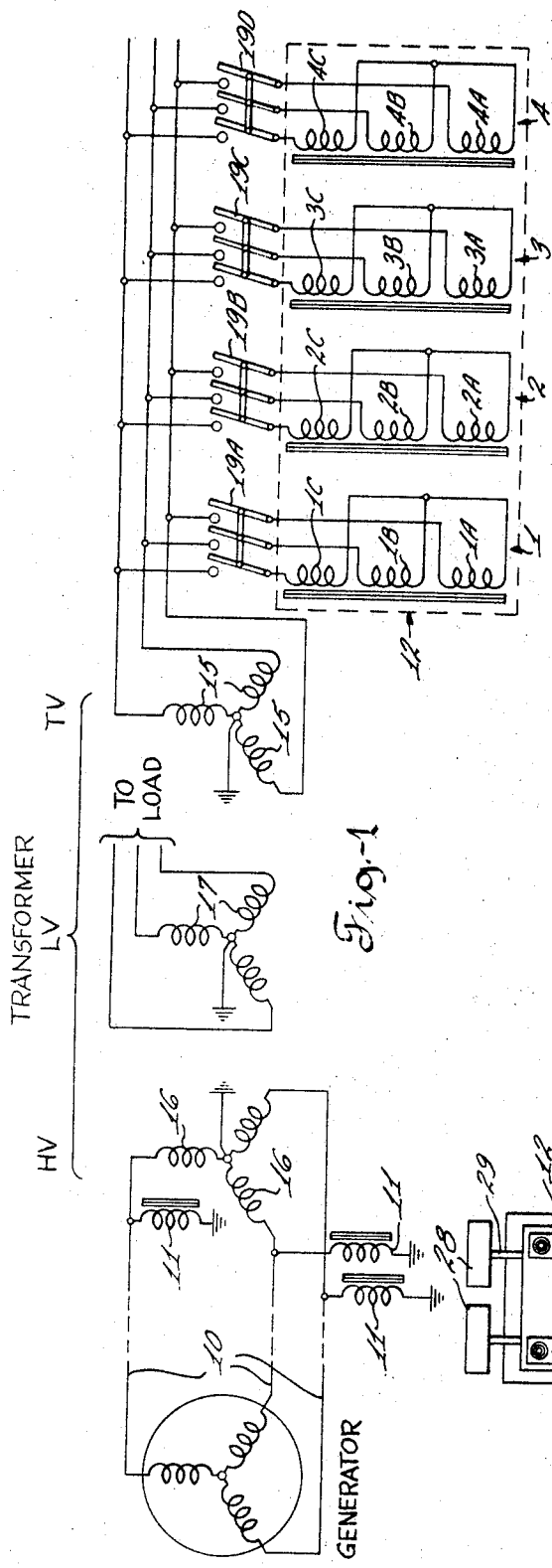
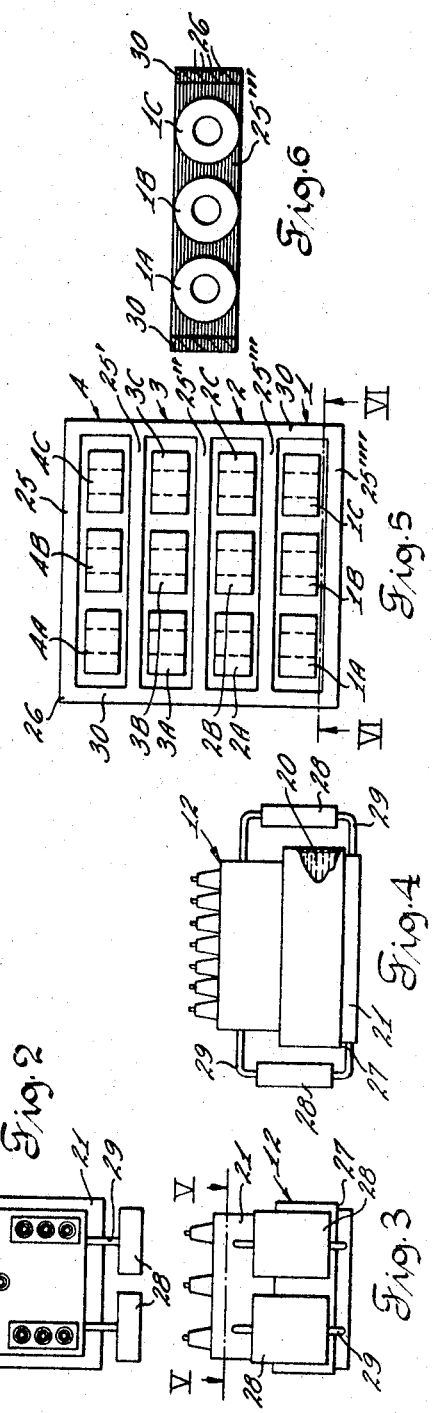
Inventor
Edward T. Norton
By Lee W. Kaiser
Attorney United States Patent Office 3,443,119
Patented May 6, 1969

3,443,119
SHUNT REACTOR FOR TRANSMISSION LINE
Edward T. Norton, East Troy, Wis., assignor to Allis-Chalmers Manufacturing Company, Milwaukee, Wis.
Filed Feb. 28, 1967, Ser. No. 619,475
Int. Cl. H02h 1/04, 3/22
U.S. Cl. 307—93
19 Claims

ABSTRACT OF THE DISCLOSURE

Overvoltages on a long, high voltage power transmission line, having a power transformer with a primary winding connected to one end of the line and a tertiary winding, are controlled by a shunt reactor having a casing enclosing a plurality of three phase reactor units and switching means for selectively connecting the reactor units to the tertiary winding. The reactor units are immersed in oil within the casing, and cooling means circulate the oil and dissipate the losses for the coils and magnetic yoke means of all the reactor units when all units are energized. Consequently the cooling means has adequate capacity to prevent the temperature rise of the coils and magnetic yoke means of a single reactor unit from exceeding its thermal rating when only the single reactor unit is in service even though excited above rated voltage, no loss of installed kvar. capacity occurs when all units are energized, and a substantial reduction in initial cost and in size is effected in comparison to a conventional dry type shunt reactor installation.

This invention relates to power transmission systems and in particular to shunt reactors for controlling overvoltages on long, high voltage power transmission lines.

Long, high voltage power transmission lines are subject to overvoltages at the line terminals during open circuit and light load conditions due to the Ferranti effect and due to transients during switching. These overvoltages can be dangerously high on extra high voltage (EHV) systems above 345 kilovolts because of the greater line voltage and length. Reactive compensation is required for the Ferranti effect because the voltage rise varies approximately as the square of line length. Reactive compensation distributed along the length of the EHV transmission line ideally provides the most effective control of the distributed capacitance reactance producing the Ferranti effect, but for economic reasons lumped reactance through shunt reactors connected directly across the line is more practical. Reactors are desirable at each line terminal if, during open circuit conditions, either terminal can be a power source.

Shunt reactors for EHV systems are usually of two types: (1) high voltage line reactors applied directly on the transmission line; and (2) lower voltage reactors applied on tertiary windings of autotransformers or three winding transformers. The most economical location for the shunt reactor is on the tertiary of the power transformer, but this arrangement removes the inductive compensation when the transformer is disconnected. An economical comprise is to use line reactors to neutralize part of the line charging current to keep the voltage just within tolerable limits in combination with transformer tertiary reactors which control the voltage to their optimum values. Normal practice is to use a ratio between tertiary and line reactors of about 2 to 1. When the line is heavily loaded, usually at lagging power factor, the tertiary reactors can be switched off to improve power factor. Switching of tertiary reactors can be done in several steps for power factor control with varying load. Further, the ratio of total installed cost of high voltage line reactors to low voltage shunt reactors is in the order of 2 to 1.

Shunt reactors for EHV service may be of the oil filled or the dry type and either iron core or air core construction with means for confining the magnetic flux within the tank of oil filled reactors. The iron core reactor uses a magnetic laminated core separated by gaps, but the gaps are sources of vibration and noise, and the cost of eliminating the noise becomes prohibitive in large EHV shunt reactors. Air core reactors with aluminum or copper shields are known and serve well on single phase applications. On three phase reactors the need to balance each phase magnetically to equalize the magnetic flux paths is a design restriction which dictates use of a triangular arrangement of coils with the axis of each coil at the corners of the triangle.

Dry type reactors of either the cast-in-concrete or the plastic reinforced type are conventionally supplied when reactors are switched in several steps for power factor control of EHV transmission lines with varying load. Usually single phase dry type reactors connected in three phase banks are selectively switched in parallel in a plurality of steps across the transformer tertiary winding to vary the reactive compensation. When applying tertiary shunt reactors there is a desired kvar. loading from the transformer high voltage winding to the transformer tertiary winding, and the impedance of the transformer from the high voltage winding to the tertiary voltage winding must be considered in the voltage rating of the reactors and in the kva. rating required. Assume as an example that a 100,000 kva. bank of three phase, dry type shunt reactors is to be connected in conventional manner to the tertiary winding of a transformer having a rated no-load voltage of 13.8 kv. in four steps of 25,000 kva. each. Assume also that the measured impedance of the transformer from high voltage winding to tertiary winding at 100,000 kva. is 15 percent. The output voltage of the transformer tertiary winding with a shunt reactor load is 100/115 or approximately 0.87 times no-load voltage, or 13 percent below its no-load voltage.

The voltage rating of dry type reactors is chosen on the basis of the output voltage of the tertiary winding with only one of the four 25,000 kva. reactors connected. Since the impedance of a single switched reactor is four times that of the four reactors in parallel, the voltage rating of the shunt reactor would be:

$$\frac{(4 \times .87)}{.13 + (4 \times .87)} \text{ times } 13.8 \text{ kv. equals } 13.3 \text{ kv.}$$

When all four reactors are in service, the tertiary winding voltage is:

$$0.87 \times 13.8 \text{ kv. equals approximately } 11.9 \text{ kv.}$$

Inasmuch as the kva. of a reactor varies as the square of the applied voltage, the kva. of the three phase bank with four normally rated 25,000 kva. reactors in service is:

$$(11.9/13.3)^2 \text{ times } 100,000 \text{ equals } 80,000 \text{ kva.}$$

and it will be appreciated that the loss of installed capacity is approximately 20,000 kvar., or about twenty percent.

As a second example, assume a 500 mva. three phase transformer having a high voltage winding rated at 345 kv., a low voltage winding rated at 161 kv., and a tertiary winding rated at 13.8 kv. Further assume the following measured impedances for the transformer based on 500 mva. load:

High to low winding—0.10 P.U. @ 500 mva.
High to tertiary winding—0.60 P.U. @ 500 mva.
Low to tertiary winding—0.50 P.U. @ 500 mva.

where P.U. stands for "per unit impedance," which is 1/100 of the percentage impedance. Also assume that 150,000 megavar. reactive compensation is to be achieved and that the reactance is to be connected in four steps to the tertiary winding which has a no-load rating of 13.8 kv. Since the need for shunt reactor compensation of EHV lines is usually applicable only to light load conditions, the effect of the voltage drop due to heavy loading from the transformer high voltage winding to the transformer low voltage winding may be neglected. However, the impedances of both the transformer and the reactor must be considered, and the impedances referred to the 150 mva. base are 150/500 times the rating at 500 mva. or:

Transformer high to tertiary winding _____ 0.18 P.U.
Reactor _____ 0.82 P.U.

Total impedance _____ 1.0 P.U.

The division of input kvar. between transformer and reactor is:

(1) Transformer (high to tertiary)=0.18 (150,000) equals 27,000 kvar.
(2) Reactor=0.82 (150,000) equals 123,000 kvar.

The voltage of the four reactors in parallel is 0.82 times the tertiary winding no-load voltage of 13.8 kv., or 11.316 kv.

As discussed above, the voltage rating of dry type reactors is conventionally chosen on the basis of the output voltage of the tertiary winding with only one reactor connected. If only one of the four reactors is in service, the reactor impedance is increased by a factor of four, and the impedances now become:

Transformer (high to tertiary) _____ Equals .18 P.U. @ 150 mva.
Reactor=4×.82 _____ Equals 3.28 P.U. @ 150 mva.

Total _____ 3.46 P.U. @ 150 mva.

The kvar. input to the high voltage transformer winding is 150,000/3.46 or 43,352 kvar., and the division of kvar. between transformer and reactor is:

Transformer _____ (.18/3.46) 43,352 or 2,255 kvar.
Reactor_____ (3.28/3.46) 43,352 or 41,097 kvar.

With one reactor in service, the voltage impressed on it is (3.28/3.46) equals 0.9479 P.U. times 13.8 kv. equals 13.082 kv. If dry type reactors are used in each step, the rating of each reactor is 41,097 kvar. at 13.082 kilovolts. The total installed rating of the four units is four times 41,097 or 164,398 kva., but when all four reactor units are connected in parallel, the available reactor load is only 123,000 kva. at 11.316 kv., thus resulting in a loss of installated capacity of 41,389 kva. The 123,000 kva. load at 11.316 kv. on the tertiary winding draws a current of $$\frac{123,000}{11.316} \times \sqrt{3}$$

equals 6280 amperes, and the transformer tertiary winding kva. is 6280 (13.8)√3 or 150,000 kvar.

It is an object of the invention to provide an improved multiple step tertiary shunt reactor arrangement which does not result in loss of installed kvar. capacity when all reactor units are in service.

It is a further object of the invention to provide an improved three phase shunt rector construction of reduced size and noise level which is particularly adapted for reactive compensation or long EHV transmission lines subject to overvoltages.

It is another object of the invention to provide an improved three phase, multiple step, tertiary shunt reactor arrangement which permits an initial cost saving of greater than forty percent in comparison to a conventional dry type reactor installation.

In accordance with the invention, overvoltages on a long, high voltage power transmission line during light load conditions are controlled by an oil filled shunt reactor enclosing a plurality of three phase reactor units adapted to be connected in steps to the tertiary winding of an electrical transformer having its primary winding connected to the receiving end of the transmission line. Cooling means are provided for the reactor which will dissipate losses for the coils and magnetic yoke means of all of the reactor units when all units are in service, and consequently the cooling means is operative to prevent the temperature rise of the core and coil of a single reactor over ambient from exceeding its thermal rating when only the single reactor unit is in service. The preferred embodiment of the multiple unit reactor has the three coils in each three phase reactor unit in radial alignment and magnetic yokes adjacent both axial ends of all three coils to straighten the lines of magnetic flux within the coils and reduce the length of the air flux path, and preferably adjacent reactor units have common magnetic yoke means.

These and other objects and advantages of the invention will be more readily apparent from the following detailed description when considered in conjunction with the accompanying drawing wherein:

FIG. 1 is a schematic circuit diagram of a long EHV transmission line having shunt reactance compensation in accordance with the invention;

FIGS. 2, 3 and 4 are plan, end and front views, respectively, of the multiple unit three phase reactor of the invention;

FIG. 5 is a view taken along line V—V of FIG. 3 showing the preferred core and coil arrangement of the reactor of FIGS. 2–4; and FIG. 6 is a view taken along line VI—VI of FIG. 5.

An air core reactor with axially short coils and a magnetic shunt around the coils to straighten the lines of magnetic flux internal of the coils, termed a "coreless iron reactor," is disclosed in the application of William C. Sealey and Michael W. Waterman, Ser. No. 553,844, filed May 31, 1966 and having the same assignee as the present invention, and is particularly adapted for EHV shunt reactors. Such coreless iron reactor having flux lines parallel to the coil axis permits use of strip conductor which improves the space factor of the coils and results in a substantial reduction in reactor size and weight for a given inductance in comparison to iron core and air core reactors, and the preferred embodiment of the present invention incorporates the construction disclosed in the aforesaid application Ser. No. 553,844.

Referring to FIG. 1 of the drawing, a long three phase power transmission line 10 which may be of the EHV type rated at 345 kilovolts and above is subject to overvoltages at the line terminals during open circuit and light load conditions due to the Ferranti effect and due to transient overvoltages during switching, and these overvoltages can be dangerously high because of the high line voltage and great length. The Ferranti effect causes a voltage rise which varies approximately as the square of the line length, and reactive compensation to control the capacitive reactance of the transmission line is provided by line reactors 11 connected near the receiving end of each phase conductor of line 10 to neutralize part of the charging current to keep the voltage just within tolerable limits and by a three phase tertiary shunt reactor 12 adapted to be connected to the tertiary winding 15 of a three phase power transformer having its primary winding 16 connected to the receiving end of transmission line 10. The secondary transformer winding 17 may supply a separate load. Switching of shunt reactors to the tertiary transformer winding 15 is preferably done in several steps for power factor control, and a plurality of three phase switching means 19A, 19B, 19C and 19D are provided so that shunt reactor 12 can be switched off in steps to improve the power factor when the transmission line 10 is heavily loaded at lagging power factor.

In accordance with the invention, four three phase reactor units 1–4, which are connected to tertiary winding 15 by switching means 19A–19D respectively, are immersed in a suitable cooling dielectric such as oil 20 in a common tank 21. Each reactor unit 1–4 includes three cylindrical coils A, B and C, one for each of the phases, and preferably each coil A, B and C has a non-magnetic core and comprises a plurality of axially aligned pancake winding (not shown), as disclosed in the aforementioned application Ser. No. 553,844, and has its axis horizontal to provide maximum cooling. Preferably the three coils A, B, C of each reactor unit 1–4 are radially aligned with their axes in a common horizontal plane and extending longitudinally of tank 21, and the corresponding phase coils of all reactor units, for example, phase coils 1A, 2A, 3A and 4A, are axially aligned. Each coil preferably is relatively short in the axial direction and has a ratio of coil radius to coil axial length greater than 0.25 to decrease the length of the flux path in air and thus increase the inductance. Further, the pancake windings comprising each phase coil A, B and C are preferably wound of strip conductive material (not shown) having a dimension in the axial direction considerably greater than its thickness in the radial direction to improve the space factor and thus reduce reactor size.

Magnetic yokes 25 having laminations 26 of high permeability magnetic steel in planes parallel to the axes of the coils are disposed adjacent both axial ends of all three phase coils A, B, C of each reactor unit 1–4 to straighten the lines of magnetic flux within the three coils A–C and minimize eddy current losses caused by the radial component of the magnetic flux. Preferably the magnetic yokes 25 are generally radial of the coils and common to adjacent reactor units 1 and 2, 2 and 3, and 3 and 4 as shown in FIG. 5. For example, magnetic yoke 25''' is common to and disposed contiguous the axial ends of coils 1A, 1B and 1C of reactor unit 1 and is also disposed contiguous the axial ends of coils 2A, 2B and 2C of reactor unit 2.

The magnetic yokes 25 of each reactor unit 1–4 preferably have end portions 30 parallel to the coil axes connecting the radial disposed yoke portions 25 and completing a closed magnetic flux path of high permeability in surrounding relation to all three phase coils A–C of each reactor unit 1–4, and preferably the magnetic core end portions 30 interconnect all of the radially disposed yoke portions 25, 25', 25'', 25''' and 25'''' of all four reactor units.

Tank 21 may have an outwardly extending horizontal shelf portion 27 around the entire periphery of the tank upon which the laminations defining the outer yoke portions 25 and 25'''' and the magnetic more side portions 30 are supported.

Coolers 28 supported from tank 21 may be of conventional construction and connected to tank 21 adjacent its upper and lower ends by suitable conduits 29 for the cooling dielectric 20. Cooling of shunt reactors requires a different approach from that followed for transformers. A shunt reactor excited at full voltage draws a full load current corresponding to its kva. rating. This rating cannot be increased by the addition of supplementary forced cooling equipment. Moreover, a self-cooled reactor needs to carry only the current corresponding to its full voltage rating. Therefore, the basic core and coils of a shunt reactor remain the same regardless of the method of cooling. The only advantage of forced cooling on shunt reactors is the reduction of the cooling equipment cost. Coolers 28 may comprise merely radiators or radiators with fans or may include forced oil-to-air heat exchangers, but coolers 28 have sufficient capacity to prevent the temperature rise above ambient of all the coils A–C of all four reactor units from exceeding their thermal rating when all four reactor units are in service and connected in parallel by switching means 19A–19D to tertiary winding 15.

In the first example above, the shunt reactor 12 would be rated at the voltage corresponding to the output voltage of the transformer tertiary finding 15 at full kva., namely 80,000 kva. at 11.9 kv. The nominal kva. rating of each of the four reactor units would be 80,000/4 or 20,000 kva. The tertiary winding voltage applied to the first nominally rated 20,000 kva. reactor unit 1, when it is the only unit in service, would be approximately 13.3 kv. The kva. drawn by the reactor would be $(13.3/11.9)^2$ times 20,000 equals 25,000 kva.

and thus results in an increase in kva. of approximately 25 percent. When only one reactor unit 1 is connected by switching means 19A to tertiary winding 15, the coolers 28 for all four units 1–4 are available to cool the single reactor unit 1, and consequently the losses of the single unit can easily be dissipated.

In the second example above, the four reactor units 1–4 would be rated at the voltage corresponding to the output potential of transformer tertiary winding 15 at full kva., namely, 123,000 kva., to correspond to the rating of the conventional installation utilizing separate dry type reactors. The output voltage of tertiary winding 15 at full kva. load is 11.316 kv., and the nominal rating of each of the four reactor units is 123,000/4 equals 30,750 kva.

The voltage applied to the first nominally rated reactor unit 1 (30,750 kva.) to be connected to tertiary winding 15 by switching means 19A is approximately 13.082 kv. The reactive kva. load of the single reactor unit in service is $(13.082/11.316)^2$ times 30,750 equals 41,097 kvar., an increase in kvar. of approximately 30 percent. The coolers 28 of multiple unit reactor 12 are capable of dissipating the losses associated with 123,000 kvar. when all four reactor units 1–4 are in service, and consequently the losses of one reactor unit 1 at 41,097 kvar. can easily be dissipated by coolers 28. The copper-over-oil temperature of one reactor unit 1 when it is overexcited at 13.082 kv. will be greater than normal, but since the oil temperature will be greatly reduced, the temperature rise of coils 1A, 1B and 1C over ambient conditions will not exceed guaranteed values.

It will be appreciated that reactor units 2, 3 and 4 may also be individually excited and cooled in the same manner. The total rated 123,000 kvar. of reactor units 1–4 will be supplied when all four units are in service and thus no loss of installed capacity occurs in comparison to the conventional arrangement of dry type reactors wherein loss of installed capacity amounted to 41,389 kvar. of the installed 164,389 kvar. The multiple unit three phase reactor of the invention permits substantial reduction in the size of the installation and results in an initial cost saving of greater than forty percent in comparison to a conventional dry type reactor installation. A conventional dry type reactor installation of the rating in the second example above requires a space of approximately sixty feet by ninety feet, whereas a reactor of the same rating embodying the invention only occupies a space of approximately twenty feet by ten feet.

While only a single embodiment has been illustrated and described, many modifications and variations thereof will be readily apparent to those skilled in the art, and consequently it is intended in the appended claims to cover all such modifications and variations which are within the true spirit and scope of the invention.

The embodiments of the invention in which an exclusive property or privilege is claimed are defined as follows:

1. For connection to the tertiary winding of a high voltage, three phase power transformer having its primary winding energized from a long, high voltage, three phase power transmission line subject to overvoltages, a three phase shunt reactor for controlling said overvoltages comprising a casing, cooling dielectric within said casing, a plurality of three phase reactor units each of which includes three coils and magnetic yoke means immersed in said dielectric within said casing, three phase switching means for selectively connecting said reactor units to said tertiary winding, means including said dielectric for cooling said coils and said magnetic yoke means of all of said reactor units so that they do not exceed a predetermined temperature above ambient when said switching means are operated to energize all of said reactor units at a predetermined voltage of said tertiary winding, whereby said cooling means prevents the coils of a single reactor unit from exceeding said predetermined temperature when said switching means are operated to connect only said single reactor unit to said tertiary winding and the coils of said single reactor unit are excited above said predetermined tertiary winding voltage, and no lose of installed kvar. capacity occurs when all of said reactor units are energized.

2. The combination of claim 1 wherein said means for cooling circulates said dielectric exterior of said casing and includes conduit means communicating at spaced points with said casing and heat exchange surfaces exposed to the atmosphere and to said dielectric.

3. The combination of claim 1 wherein said coils are cylindrical and have horizontal axes and nonmagnetic cores and each reactor unit includes three radially aligned coils and said magnetic yoke means are laminated and disposed adjacent both axial ends of all three coils and have the laminations thereof in planes parallel to the coil axes.

4. The combination of claim 3 wherein the axes of corresponding phase coils of all of said reactor units are substantially coincident and the magnetic yoke means of adjacent reactor units is common to both said adjacent units.

5. The combination of claim 3 wherein each said magnetic yoke means is closed and surrounds all three coils of said reactor unit.

6. The combination of claim 4 wherein said magnetic yoke means of all of said reactor units are interconnected by laminated magnetic steel portions parallel to the coil axes completing closed magnetic paths in surrounding relation to the three coils of each said reactor unit.

7. In combination with a long, three phase, power transmission line subject to overvoltages and a three phase power transformer connected to one end of said transmission line and having primary, secondary and tertiary windings, a three phase shunt reactor including a plurality of three phase reactor units for controlling said overvoltages including a casing, a cooling dielectric within said casing, a plurality of cylindrical reactor coils having nonmagnetic cores immersed in said dielectric within said casing with their axes horizontal and arranged in three groups each of which corresponds to one of the three phases and wherein all of the coils corresponding to one of the phases are axially aligned, each said reactor unit including one of said coils from each of said phase groups and magnetic yoke means adjacent the coils, three phase switching means for selectively connecting said reactor units to said tertiary winding to permit energization of said reactor units in parallel, means including said dielectric for cooling said coils and said magnetic yoke means of all of said reactor units sufficiently to prevent them from exceeding a predetermined temperature above ambient when said switching means are operated to energize all of said reactor units in parallel at a predetermined voltage of said tertiary winding, whereby said cooling means prevent the coils and magnetic yoke means of a single reactor unit from exceeding said predetermined temperature when said switching means is operated to connect only said single reactor unit to said tertiary winding and they are excited above said predetermined voltage.

8. The combination of claim 7 wherein the three coils of each said reactor unit are radially aligned and said magnetic yoke means in each said reactor unit is laminated and disposed adjacent both axial ends of the three coils of said reactor unit and said means for cooling includes means for circulating said dielectric.

9. The combination of claim 8 wherein said yoke means of each said reactor unit are closed and surround all three coils of said reactor unit.

10. The combination of claim 9 wherein said yoke means of adjacent reactor units are common and including laminated magnetic portions disposed parallel to the axes of said coils and connecting said yoke means of all of said reactor units and completing said yoke means of all of said reactor units and completing closed magnetic circuits in surrounding relation to the three coils of each said reactor unit.

11. For connection to the tertiary winding of a high voltage, three phase power transformer having the primary winding thereof energized at one end of a long, high voltage, three phase transmission line subject to overvoltages, a three phase shunt reactor for controlling said overvoltages comprising a casing, a cooling dielectric liquid within said casing, a plurality of reactor units each of which includes three coils immersed in said liquid within said casing and magnetic yoke means disposed adjacent the coils, three phase switching means for selectively connecting said reactor units to said tertiary winding to permit energization of the coils of said reactor units in parallel, and means for cooling said coils of all of said reactor units sufficiently so that they do not exceed a predetermined temperature when said switching means are operated to energize the coils of all of said reactor units at a predetermined voltage of said tertiary winding, said cooling means circulating said dielectric exterior of the casing and having heat exchange surfaces exposed to the atmosphere and to said dielectric, whereby said cooling means prevent the coils and magnetic yoke means of a single reactor unit from exceeding said predetermined temperature when said switching means are operated to connect only said single reactor unit to said tertiary winding and they are excited above said predetermined voltage.

12. The combination of claim 11 wherein the three coils of each reactor unit are cylindrical and radially aligned and have horizontal axes and nonmagnetic cores and said magnetic yoke means of each reactor unit is adjacent both axial ends of all three coils and straightens the magnetic flux lines within said coils.

13. The combination of claim 11 wherein the axes of corresponding phase coils of all of said reactor units are substantially coincident and the magnetic yoke means of adjacent reactor units are common to both said adjacent reactor units.

14. A three phase reactor comprising, in combination, a casing, cooling dielectric within said casing, a plurality of three phase reactor units each of which includes three coils and magnetic yoke means adjacent said coils immersed in said dielectric within said casing, and means for cooling the coils and magnetic yoke means of all of said reactor units sufficiently so that they do not exceed a predetermined temperature when said coils of all of said reactor units are energized at a predetermined voltage, whereby said cooling means prevent the coils and yoke means of a single reactor unit from exceeding said predetermined temperature when its coils are excited at a potential higher than said predetermined voltage.

15. A three phase reactor in accordance with claim 14 wherein said means for cooling circulates said dielectric exterior of said casing and includes conduit means communicating at spaced points with said casing and heat exchange surfaces exposed to the atmosphere and to said dielectric.

16. A reactor in accordance with claim 14 wherein said coils are cylindrical and have horizontal axes and nonmagnetic cores and the three coils of each reactor unit are radially aligned and said magnetic yoke means of each reactor unit is laminated and disposed adjacent both axial ends of all three coils and has the laminations in planes parallel to the coil axes.

17. A reactor in accordance with claim 16 wherein said laminated yoke means provides a closed magnetic path in surrounding relation to the three coils of said reactor unit.

18. A reactor in accordance with claim 17 wherein corresponding phase coils of all said reactor units are axially aligned and said magnettic yoke means of adjacent reactor units are common to both said adjacent units.

19. A reactor in accordance with claim 18 wherein said magnetic yoke means of all of said reactor units are interconnected by laminated magnetic members parallel to the coil axes completing closed magnetic paths in surrounding relation to the three coils of each of said reactor units.

References Cited
UNITED STATES PATENTS

| | | | |
|---|---|---|---|
| 2,034,518 | 3/1936 | Kierstead | 336—5 |
| 3,290,510 | 12/1966 | Rose | 336—12 |
| 3,356,978 | 12/1967 | Mugnier et al. | 336—215 |
| 3,362,000 | 1/1968 | Sealey et al. | 336—58 |

ROBERT K. SCHAEFER, *Primary Examiner.*

D. SMITH, JR., *Assistant Examiner.*

U.S. Cl. X.R.

317—61.5; 336—5, 58, 215

UNITED STATES PATENT OFFICE

CERTIFICATE OF CORRECTION

Patent No. 3,443,119

May 6, 1969

Edward T. Norton

It is certified that error appears in the above identified patent and that said Letters Patent are hereby corrected as shown below:

Column 7, line 23, "lose" should read -- loss --; same line 23, "kvar" should read -- kvar. --. Column 8, line 10, cancel "said yoke means of"; line 11, cancel "all of said reactor units and completing".

Signed and sealed this 14th day of April 1970.

(SEAL)
Attest:

Edward M. Fletcher, Jr.
Attesting Officer

WILLIAM E. SCHUYLER, JR.
Commissioner of Patents